United States Patent
Buoni et al.

(10) Patent No.: US 10,051,366 B1
(45) Date of Patent: Aug. 14, 2018

(54) THREE-DIMENSIONAL BEAM FORMING WITH A MICROPHONE ARRAY

(71) Applicant: Sonos, Inc., Santa Barbara, CA (US)

(72) Inventors: Matthew Buoni, Goleta, CA (US); Romi Kadri, Cambridge, MA (US); Tetsuro Oishi, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 15/719,454

(22) Filed: Sep. 28, 2017

(51) Int. Cl.
*H04R 3/00* (2006.01)
*H04R 29/00* (2006.01)
*G10L 15/08* (2006.01)
*H04R 1/40* (2006.01)
*G10L 15/22* (2006.01)

(52) U.S. Cl.
CPC .............. *H04R 3/005* (2013.01); *G10L 15/08* (2013.01); *G10L 15/22* (2013.01); *H04R 1/406* (2013.01); *H04R 29/005* (2013.01); *G10L 2015/088* (2013.01); *G10L 2015/223* (2013.01); *H04R 2430/21* (2013.01)

(58) Field of Classification Search
CPC ... G10L 15/08; G10L 15/22; G10L 2015/088; G10L 2015/223; H04R 3/005
USPC ......................................................... 381/92
See application file for complete search history.

(56) References Cited

U.S. PATENT DOCUMENTS

| | | | |
|---|---|---|---|
| 4,741,038 A * | 4/1988 | Elko | G10K 11/346 367/121 |
| 4,941,187 A | 7/1990 | Slater | |
| 5,440,644 A | 8/1995 | Farinelli et al. | |
| 5,740,260 A | 4/1998 | Odom | |
| 5,761,320 A | 6/1998 | Farinelli et al. | |

(Continued)

FOREIGN PATENT DOCUMENTS

| | | |
|---|---|---|
| AU | 2017100486 A4 | 6/2017 |
| AU | 2017100581 A4 | 6/2017 |

(Continued)

OTHER PUBLICATIONS

US 9,299,346, 03/2016, Hart et al. (withdrawn)

(Continued)

*Primary Examiner* — Khai N Nguyen
(74) *Attorney, Agent, or Firm* — McDonnell Boehnen Hulbert & Berghoff LLP

(57) ABSTRACT

Systems and methods for three-dimensional beamforming disclosed herein include, among other features (i) generating a set of received-sound beams by applying a plurality of sets of beamforming coefficients stored in a tangible memory of the network device to sound received via a microphone array of the network device, wherein each received-sound beam corresponds to a separate direction relative to the microphone array, (ii) identifying a subset of the received-sound beams comprising speech content, (iii) for each received-sound beam in the subset of the received-sound beams comprising speech content, determining whether the speech content comprises a wake word, (iv) selecting one final received-sound beam from the received-sound beams in the subset of the received-sound beams determined to comprise a wake word; and (v) causing the selected one final received-sound beam to be processed to identify a voice command.

20 Claims, 8 Drawing Sheets

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,301,603 B1 | 10/2001 | Maher et al. |
| 6,311,157 B1 | 10/2001 | Strong |
| 6,404,811 B1 | 6/2002 | Cvetko et al. |
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van et al. |
| 7,702,508 B2 | 4/2010 | Bennett |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,290,603 B1 | 10/2012 | Lambourne |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,483,853 B1 | 7/2013 | Lambourne |
| 8,484,025 B1 | 7/2013 | Moreno et al. |
| 8,831,761 B2 | 9/2014 | Kemp et al. |
| 8,831,957 B2 | 9/2014 | Taubman et al. |
| 8,938,394 B1 | 1/2015 | Faaborg et al. |
| 8,942,252 B2 | 1/2015 | Balassanian et al. |
| 8,983,844 B1 | 3/2015 | Thomas et al. |
| 9,042,556 B2 | 5/2015 | Kallai et al. |
| 9,094,539 B1 | 7/2015 | Noble |
| 9,215,545 B2 | 12/2015 | Dublin et al. |
| 9,251,793 B2 | 2/2016 | Lebeau et al. |
| 9,262,612 B2 | 2/2016 | Cheyer |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,813,810 B1 * | 11/2017 | Nongpiur ............... H04R 3/005 |
| 9,820,036 B1 * | 11/2017 | Tritschler ............... H04R 1/326 |
| 9,826,306 B2 | 11/2017 | Lang |
| 9,881,616 B2 * | 1/2018 | Beckley .................. G10L 17/04 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 * | 2/2003 | Yang ...................... H04R 3/005 704/233 |
| 2003/0157951 A1 | 8/2003 | Hasty |
| 2004/0024478 A1 | 2/2004 | Hans et al. |
| 2005/0164664 A1 * | 7/2005 | DiFonzo ................. H04L 45/00 455/277.1 |
| 2005/0195988 A1 | 9/2005 | Tashev et al. |
| 2005/0283330 A1 | 12/2005 | Laraia et al. |
| 2006/0147058 A1 | 7/2006 | Wang |
| 2006/0190968 A1 | 8/2006 | Jung et al. |
| 2006/0247913 A1 | 11/2006 | Huerta et al. |
| 2006/0262943 A1 * | 11/2006 | Oxford .................. H04R 3/005 381/92 |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0076131 A1 | 4/2007 | Li et al. |
| 2007/0140058 A1 | 6/2007 | McIntosh et al. |
| 2007/0142944 A1 | 6/2007 | Goldberg et al. |
| 2008/0090537 A1 | 4/2008 | Sutardja |
| 2008/0248797 A1 | 10/2008 | Freeman et al. |
| 2009/0003620 A1 | 1/2009 | McKillop et al. |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0326949 A1 | 12/2009 | Douthitt et al. |
| 2010/0014690 A1 * | 1/2010 | Wolff ..................... H04R 3/005 381/92 |
| 2010/0023638 A1 | 1/2010 | Bowman |
| 2010/0075723 A1 | 3/2010 | Min et al. |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0091055 A1 | 4/2011 | Leblanc |
| 2011/0145581 A1 | 6/2011 | Malhotra et al. |

(56) References Cited

U.S. PATENT DOCUMENTS

| | | |
|---|---|---|
| 2011/0267985 A1 | 11/2011 | Wilkinson et al. |
| 2011/0280422 A1 | 11/2011 | Neumeyer et al. |
| 2011/0299706 A1 | 12/2011 | Sakai |
| 2012/0131125 A1 | 5/2012 | Seidel et al. |
| 2012/0163603 A1 | 6/2012 | Abe et al. |
| 2012/0177215 A1 | 7/2012 | Bose et al. |
| 2012/0297284 A1 | 11/2012 | Matthews, III et al. |
| 2013/0006453 A1 | 1/2013 | Wang et al. |
| 2013/0024018 A1 | 1/2013 | Chang et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0216056 A1 | 8/2013 | Thyssen |
| 2013/0317635 A1 | 11/2013 | Bates et al. |
| 2013/0329896 A1 | 12/2013 | Krishnaswamy et al. |
| 2013/0331970 A1 | 12/2013 | Beckhardt et al. |
| 2013/0332165 A1* | 12/2013 | Beckley ............... G10L 17/04 704/246 |
| 2013/0343567 A1 | 12/2013 | Triplett et al. |
| 2014/0003611 A1 | 1/2014 | Mohammad et al. |
| 2014/0003635 A1 | 1/2014 | Mohammad et al. |
| 2014/0006026 A1 | 1/2014 | Lamb et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0167931 A1 | 6/2014 | Lee et al. |
| 2014/0195252 A1 | 7/2014 | Gruber et al. |
| 2014/0244013 A1 | 8/2014 | Reilly |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0277650 A1* | 9/2014 | Zurek ............... H04R 3/00 700/94 |
| 2014/0363022 A1 | 12/2014 | Dizon et al. |
| 2015/0010169 A1 | 1/2015 | Popova et al. |
| 2015/0016642 A1 | 1/2015 | Walsh et al. |
| 2015/0063580 A1* | 3/2015 | Huang ............... G10L 21/0208 381/66 |
| 2015/0086034 A1 | 3/2015 | Lombardi et al. |
| 2015/0104037 A1 | 4/2015 | Lee et al. |
| 2015/0154976 A1 | 6/2015 | Mutagi |
| 2015/0186032 A1 | 6/2015 | Gao et al. |
| 2015/0189438 A1 | 7/2015 | Hampiholi et al. |
| 2015/0200454 A1 | 7/2015 | Heusdens et al. |
| 2015/0222987 A1 | 8/2015 | Angel, Jr. et al. |
| 2015/0228274 A1 | 8/2015 | Leppänen et al. |
| 2015/0253292 A1 | 9/2015 | Larkin et al. |
| 2015/0253960 A1 | 9/2015 | Lin et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0341406 A1 | 11/2015 | Rockefeller et al. |
| 2015/0363061 A1 | 12/2015 | De, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0029142 A1 | 1/2016 | Isaac et al. |
| 2016/0036962 A1 | 2/2016 | Rand et al. |
| 2016/0042748 A1 | 2/2016 | Jain et al. |
| 2016/0057522 A1 | 2/2016 | Choisel et al. |
| 2016/0077710 A1 | 3/2016 | Lewis et al. |
| 2016/0088392 A1* | 3/2016 | Huttunen ............... H04R 5/027 381/92 |
| 2016/0093304 A1 | 3/2016 | Kim et al. |
| 2016/0098393 A1 | 4/2016 | Hebert |
| 2016/0157035 A1 | 6/2016 | Russell et al. |
| 2016/0173578 A1 | 6/2016 | Sharma et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0314782 A1 | 10/2016 | Klimanis |
| 2016/0352915 A1 | 12/2016 | Gautama |
| 2016/0353218 A1 | 12/2016 | Starobin et al. |
| 2017/0003931 A1 | 1/2017 | Dvortsov et al. |
| 2017/0026769 A1 | 1/2017 | Patel |
| 2017/0060526 A1 | 3/2017 | Barton et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0084292 A1 | 3/2017 | Yoo |
| 2017/0090864 A1* | 3/2017 | Jorgovanovic ............ G06F 3/167 |
| 2017/0092278 A1 | 3/2017 | Evermann et al. |
| 2017/0092297 A1 | 3/2017 | Sainath et al. |
| 2017/0103755 A1 | 4/2017 | Jeon et al. |
| 2017/0125037 A1 | 5/2017 | Shin |
| 2017/0177585 A1 | 6/2017 | Rodger et al. |
| 2017/0178662 A1 | 6/2017 | Ayrapetian et al. |
| 2017/0193999 A1 | 7/2017 | Aleksic et al. |
| 2017/0206896 A1 | 7/2017 | Ko et al. |
| 2017/0214996 A1* | 7/2017 | Yeo .................. H04R 1/1041 |
| 2017/0236512 A1 | 8/2017 | Williams et al. |
| 2017/0242653 A1 | 8/2017 | Lang et al. |
| 2017/0270919 A1 | 9/2017 | Parthasarathi et al. |
| 2017/0353789 A1* | 12/2017 | Kim .................. H04R 3/005 |
| 2018/0033428 A1* | 2/2018 | Kim .................. G10L 15/20 |

FOREIGN PATENT DOCUMENTS

| | | |
|---|---|---|
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| KR | 20100111071 A | 10/2010 |
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016033364 A1 | 3/2016 |
| WO | 2017039632 A1 | 3/2017 |

OTHER PUBLICATIONS

FudioTron Quick Start Guide, Version 1.0, Mar. 2001, 24 pages.
Final Office Action dated Jun. 15, 2017, issued in connection with U.S. Appl. No. 15/098,718, filed Apr. 14, 2016, 15 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated May 23, 2017, issued in connection with International Application No. PCT/US2017/018739, filed Feb. 21, 2017, 10 pages.
International Searching Authority, International Search Report and Written Opinion dated Oct. 23, 2017, issued in connection with International Application No. PCT/US2017/042170, filed Jul. 14, 2017, 15 pages.

(56) References Cited

OTHER PUBLICATIONS

International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Morales-Cordovilla et al. "Room Localization for Distant Speech Recognition," Proceedings of Interspeech 2014, Sep. 14, 2014, 4 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Feb. 7, 2017, issued in connection with U.S. Appl. No. 15/131,244, filed Apr. 18, 2016, 12 pages.
Notice of Allowance dated Jun. 14, 2017, issued in connection with U.S. Appl. No. 15/282,554, filed Sep. 30, 2016, 11 pages.
Notice of Allowance dated Dec. 15, 2017, issued in connection with U.S. Appl. No. 15/223,218, filed Jul. 29, 2016, 7 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed on Apr. 18, 2016, 9 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Palm, Inc., "Handbook for the Palm VII Handheld," May 2000, 311 pages.
Presentations at WinHEC 2000, May 2000, 138 pages.
Tsiami et al. "Experiments in acoustic source localization using sparse arrays in adverse indoors environments", 2014 22nd European Signal Processing Conference, Sep. 1, 2014, 5 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Notice of Allowance dated Feb. 14, 2017, issued in connection with U.S. Appl. No. 15/229,855, filed Aug. 5, 2016, 11 pages.
Notice of Allowance dated Aug. 14, 2017, issued in connection with U.S. Appl. No. 15/098,867, filed Apr. 14, 2016, 10 pages.
Notice of Allowance dated Dec. 13, 2017, issued in connection with U.S. Appl. No. 15/784,952, filed Oct. 16, 2017, 9 pages.
Notice of Allowance dated Jul. 12, 2017, issued in connection with U.S. Appl. No. 15/098,805, filed Apr. 14, 2016, 8 pages.
Notice of Allowance dated Dec. 4, 2017, issued in connection with U.S. Appl. No. 15/277,810, filed Sep. 27, 2016, 5 pages.
Non-Final Office Action dated Sep. 6, 2017, issued in connection with U.S. Appl. No. 15/131,254, filed Apr. 18, 2016, 13 pages.
Non-Final Office Action dated Feb. 6, 2018, issued in connection with U.S. Appl. No. 15/237,133, filed Aug. 15, 2016, 6 pages.
Non-Final Office Action dated Feb. 6, 2018, issued in connection with U.S. Appl. No. 15/211,689, filed Jul. 15, 2016, 32 pages.
Non-Final Office Action dated Jun. 30, 2017, issued in connection with U.S. Appl.No. 15/277,810, filed Sep. 27, 2016, 13 pages.
Non-Final Office Action dated Oct. 26, 2017, issued in connection with U.S. Appl. No. 15/438,744, filed Feb. 21, 2017, 12 pages.
Non-Final Office Action dated Jan. 26, 2017, issued in connection with U.S. Appl. No. 15/098,867, filed Apr. 14, 2016, 16 pages.
Non-Final Office Action dated Jul. 25, 2017, issued in connection with U.S. Appl. No. 15/273,679, filed Jul. 22, 2016, 11 pages.
Non-Final Office Action dated Feb. 20, 2018, issued in connection with U.S. Appl. No. 15/211,748, filed Jul. 15, 2016, 31 pages.
Non-Final Office Action dated Apr. 19, 2017, issued in connection with U.S. Appl. No. 15/131,776, filed Apr. 18, 2016, 12 pages.
Non-Final Office Action dated Sep. 14, 2017, issued in connection with U.S. Appl. No. 15/178,180, filed Jun. 9, 2016, 16 pages.
Non-Final Office Action dated Jan. 13, 2017, issued in connection with U.S. Appl. No. 15/098,805, filed Apr. 14, 2016, 11 pages.
Non-Final Office Action dated Dec. 12, 2016, issued in connection with U.S. Appl. No. 15/098,718, filed Apr. 14, 2016, 11 pages.
Non-Final Office Action dated Jan. 10, 2018, issued in connection with U.S. Appl. No. 15/438,725, filed Feb. 21, 2017, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/098,718, filed Apr. 14, 2016, 15 pages.
Non-Final Office Action dated Mar. 9, 2017, issued in connection with U.S. Appl. No. 15/098,760, filed Apr. 14, 2016, 13 pages.
Non-Final Office Action dated Feb. 8, 2017, issued in connection with U.S. Appl. No. 15/098,892, filed Apr. 14, 2016, 17 pages.

* cited by examiner

THREE-DIMENSIONAL BEAM FORMING WITH A MICROPHONE ARRAY

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Network devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

The present disclosure describes systems and methods for, among other things, performing three-dimensional beamforming with a microphone array. In some embodiments, the microphone array is a component of a network device, such as voice-enabled device ("VED"). In operation, a VED (or other network device) equipped with a microphone array listens for a "wake word" or wake phrase that prompts the VED to capture speech for voice command processing. In some embodiments, a wake phrase includes a wake word, or vice-versa.

Some examples of a "wake word" (or wake phrase) may include, "Hey Sonos" for a Sonos VED, "Alexa" for an Amazon VED, or "Siri" for an Apple VED. Other VEDs from other manufacturers may use different wake words and/or phrases. In operation, a VED equipped with a microphone array listens for its wake word. And in response to detecting its wake word, the VED (individually or in combination with one or more other computing devices) records speech following the wake word, analyzes the recorded speech to determine a voice command, and then implements the voice command. Examples of typical voice commands include, "Play my Beatles playlist," "Turn on my living room lights," "Set my thermostat to 75 degrees," "add milk and bananas to my shopping list," and so on.

One challenge with determining voice commands is obtaining a high-quality recording of the speech comprising the voice command for analysis. A higher quality recording of the speech comprising a voice command is easier for voice algorithms to analyze as compared to a lower quality recording of the speech comprising the voice command. Obtaining a high-quality recording of speech comprising a voice command can be challenging in environments where multiple people may be talking, appliances (e.g., televisions, stereos, air conditioners, dishwashers, etc.) are making noise, and other extraneous sounds are present.

One way to improve the quality of sound recordings comprising voice commands is to use beamforming to (i) amplify sound coming from the direction from where the speech containing the voice command originated relative to the microphone array and (ii) attenuate sound coming from other directions relative to the microphone array. With conventional beamforming methods, a planar microphone array comprising a plurality of microphones arranged along a two-dimensional plane can perform spatial localization of sounds (i.e., determine the direction from where a sound originated) within two polar dimensions relative to the microphone array. However, with conventional beamforming methods, a planar microphone array is unable to reliably perform special localization of sounds within three polar dimensions relative to the microphone array.

In some embodiments of the systems and methods disclosed herein, a two-dimensional planar microphone array is used for spatial localization of sounds in three dimensions based on one or both of (i) delays in arrival times of a sound between the different microphones of the array, and (ii) vertical asymmetry of the relative response of each microphone in the array. Spatial localization in three-dimensions enables the microphone array to achieve a higher signal-to-noise ratio (SNR) when recording a point-source input (like a voice) over conventional two-dimensional beamforming approaches typically employed with planar microphone arrays. Thus, in this manner, some embodiments enable a VED or other network device equipped with a microphone array to record a higher quality recording of speech comprising a voice command as compared to existing systems that do not implement the features and functions disclosed and described herein.

In operation, some embodiments employ a polar response matrix that represents differences in responses of each microphone of the array relative to every other microphone in the array. In some embodiments, the polar response matrix enables a microphone array (e.g., a planar microphone array) to perform spatial localization in three dimensions at a resolution of about five-degree increments around the horizontal plane and about fifteen-degree increments around the vertical plane. Some embodiments may perform spatial localization in three dimensions at higher or lower horizontal and/or vertical resolutions depending at least in part on (i) the number of microphones in the microphone array and (ii) the physical arrangement of the microphones in the microphone array.

As described above, in some embodiments, the microphone array is a component of a network device. A network device is any computing device comprising (i) one or more processors, (ii) one or more network interfaces and/or one or more other types of communication interfaces, and (iii) tangible, non-transitory computer-readable media comprising instructions encoded therein, where the instructions, when executed at least in part by the one or more processors, cause the network device to perform the functions disclosed and described herein. A network device is generic class of devices that includes, but is not limited to voice enabled devices (VEDs), networked microphone devices (NMDs), audio playback devices (PBDs), and video playback devices (VPDs). VEDs are a class of devices that includes but is not limited to NMDs, PBDs, and VPDs. For example, one type of VED is an NMD, which is a network device comprising one or more processors, a network interface, and one or more microphones. Some NMDs may additionally include one or more speakers and perform media playback functions. Another type of VED is a PBD, which is a network device comprising one or more processors, a network interface, and one or more speakers. Some PBDs may optionally include one or more microphones and perform the functions of an NMD. Yet another type of VED is a VPD, which is a network device comprising one or more processors, a network interface, one or more speakers, and at least one video display. Some VPDs may optionally include one or more microphones and perform the functions of an NMD. PBDs and VPDs may be generally referred to as media playback devices.

In some embodiments, the microphone array is a planar microphone array comprising a plurality of microphones arranged along a two-dimensional plane having a lateral axis (sometimes referred to an "x" axis) and a horizontal axis (sometimes referred to as a "y" axis). Although the systems and methods disclosed herein could be used with any array of two or more microphones (planar or otherwise), the systems and methods disclosed and described herein are particularly advantageous for planar microphone arrays because, in operation, the features and functions of the disclosed systems and methods enable a computing device to perform three-dimensional beam forming with a planar microphone array.

Some examples include a network device using the above-described polar response matrix with a microphone array to generate a static set of received-sound beams. In some embodiments, the network device generates a static set of received-sound beams by applying a plurality of sets of beamforming coefficients arranged in the polar response matrix stored in a tangible, non-transitory computer-readable memory to sound received via the microphone array, where each received-sound beam corresponds to a separate three-dimensional polar direction relative to the microphone array. In operation, the network device generates each received-sound beam simultaneously (or at least substantially simultaneously) and monitors every received-sound beam in parallel (or at least substantially in parallel).

While generating a separate received-sound beam for each of a plurality of separate three-dimensional polar directions relative to the microphone array of the network device, the network device monitors every generated received-sound beam to identify a subset of the received-sound beams that contain speech content. For each received-sound beam in the identified subset of received-sound beams that contains speech content, the network device next determines whether the speech content includes a wake word. And among the received-sound beams that include a wake word, the network device selects one final received-sound beam that includes a wake word, and thereafter, causes the selected one final received-sound beam to be processed to identify a voice command.

Systems and methods for generating a polar response matrix comprising beamforming coefficients for use with a microphone-array-equipped network device are also disclosed and described. Some embodiments include, for a reference microphone array positioned in an anechoic chamber, generating a first set of beamforming coefficients based on a first plurality of measurements of a corresponding first plurality of sounds, wherein each sound of the corresponding first plurality of sounds originates from a separate three-dimensional polar direction in the anechoic chamber relative to the reference microphone array positioned in the anechoic chamber. Use of an anechoic chamber is not required in all embodiments.

This summary overview is illustrative only and is not intended to be limiting. In addition to the illustrative aspects, embodiments, and features described above, further aspects, embodiments, and features will become apparent by reference to the figures and the following detailed description.

BRIEF DESCRIPTION OF THE DRAWINGS

Features, aspects, and advantages of the presently disclosed technology may be better understood with regard to the following description, appended claims, and accompanying drawings where:

Figure 1:
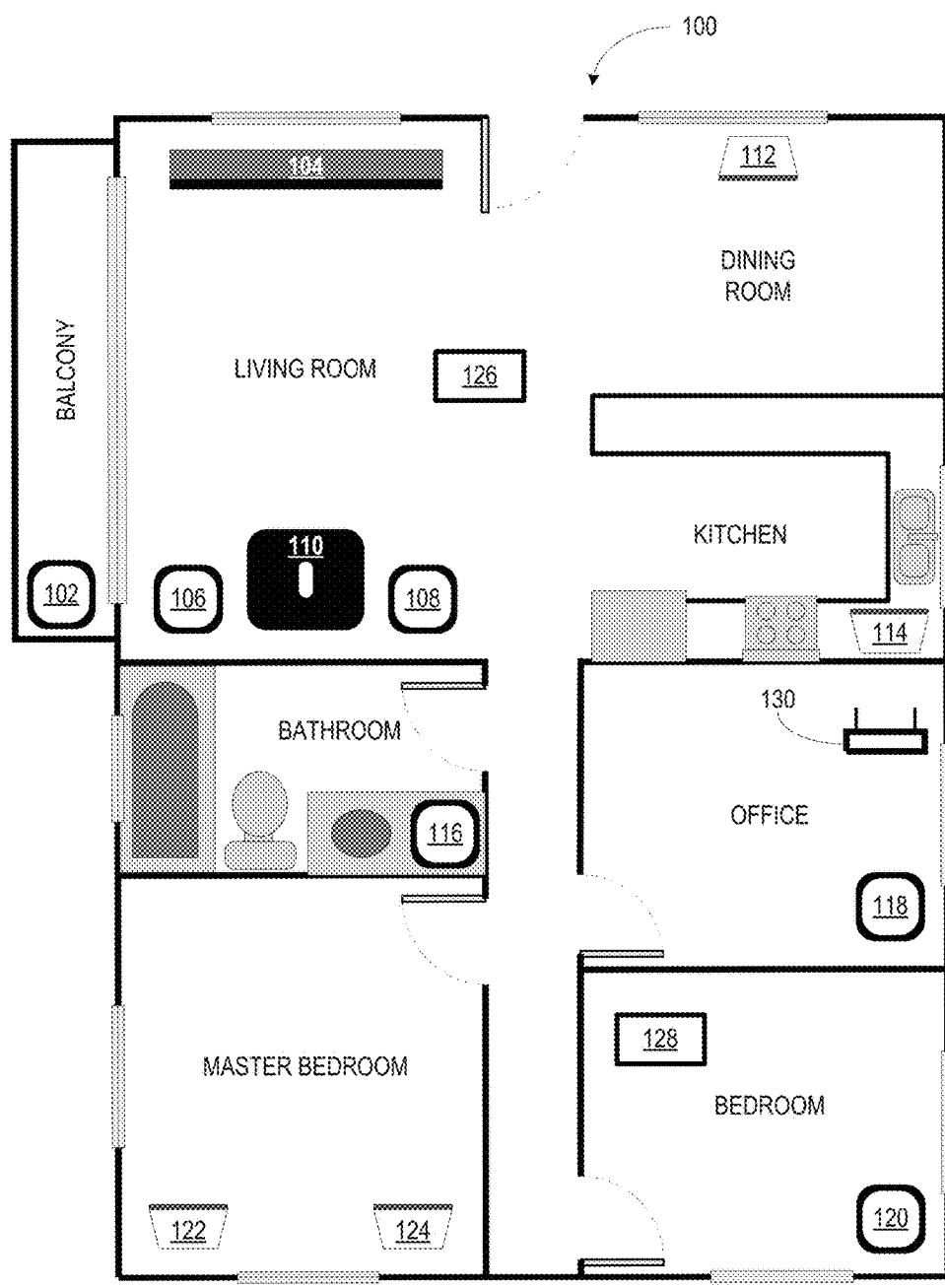
FIG. 1 shows an example media playback system configuration in which certain embodiments may be practiced.

The drawings are for the purpose of illustrating example embodiments, but it is understood that the inventions are not limited to the arrangements and instrumentalities shown in the drawings.

DETAILED DESCRIPTION

I. Overview

One type of VED is a networked microphone device ("NMD"), which is a network device comprising one or more processors, a network interface, and one or more microphones. Some NMDs may additionally include one or more speakers. Another type of VED is an audio playback device ("PBD"), which is a network device comprising one or more processors, a network interface, one or more microphones, and one or more speakers. Yet another type of VED is a video playback device ("VPD"), which is a network device comprising one or more processors, a network interface, one or more microphones, one or more speakers, and at least one video display. PBDs and VPDs may be generally referred to as media playback devices. As used herein, the term network device includes but is not necessarily limited to VEDs, PBDs, NMDs, and PVDs, and the term VED includes but is not necessarily limited to PBDs, NMDs, and PVDs.

Each of the above-described VEDs may implement at least some voice control functionality, which allows the VED (individually or perhaps in combination with one or more other computing devices) to act upon voice commands received via its microphones, thereby allowing a user to control the VED and perhaps other devices, too.

Further embodiments include tangible, non-transitory computer-readable media having stored thereon program instructions that, upon execution by a computing device, cause the computing device to perform the features and functions disclosed and described herein.

Some embodiments include a computing device comprising at least one processor, as well as data storage and program instructions. In operation, the program instructions are stored in the data storage, and upon execution by the at least one processor, cause the computing device (individually or in combination with other components or systems) to perform the features and functions disclosed and described herein.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130. In operation, any of the playback devices (PBDs) 102-124 may be voice-enabled devices (VEDs) as described earlier.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
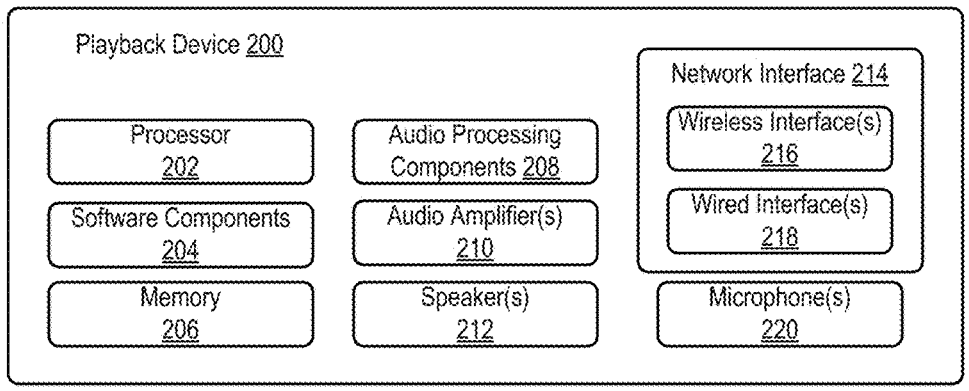
FIG. 2 shows a functional block diagram of an example playback device.

FIG. 2 shows a functional block diagram of an example playback device 200 that may be configured to be one or more of the playback devices 102-124 of the media playback system 100 of FIG. 1. As described above, a playback device (PBD) 200 is one type of voice-enabled device (VED).

The playback device 200 includes one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In some examples, the one or more processors 202 include one or more clock-driven computing components configured to process input data according to instructions stored in the memory 206. The memory 206 may be a tangible, non-transitory computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network, including but not limited to data to/from other VEDs (e.g., commands to perform an SPL measurement, SPL measurement data, commands to set a system response volume, and other data and/or commands to facilitate performance of the features and functions disclosed and described herein). As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices", "bonded group", or "stereo pair") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices and/or other VEDs. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
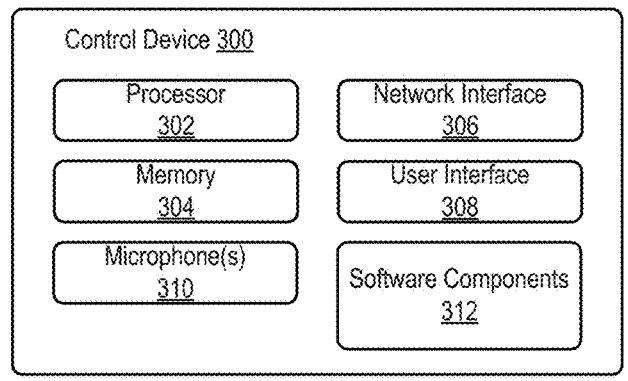
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
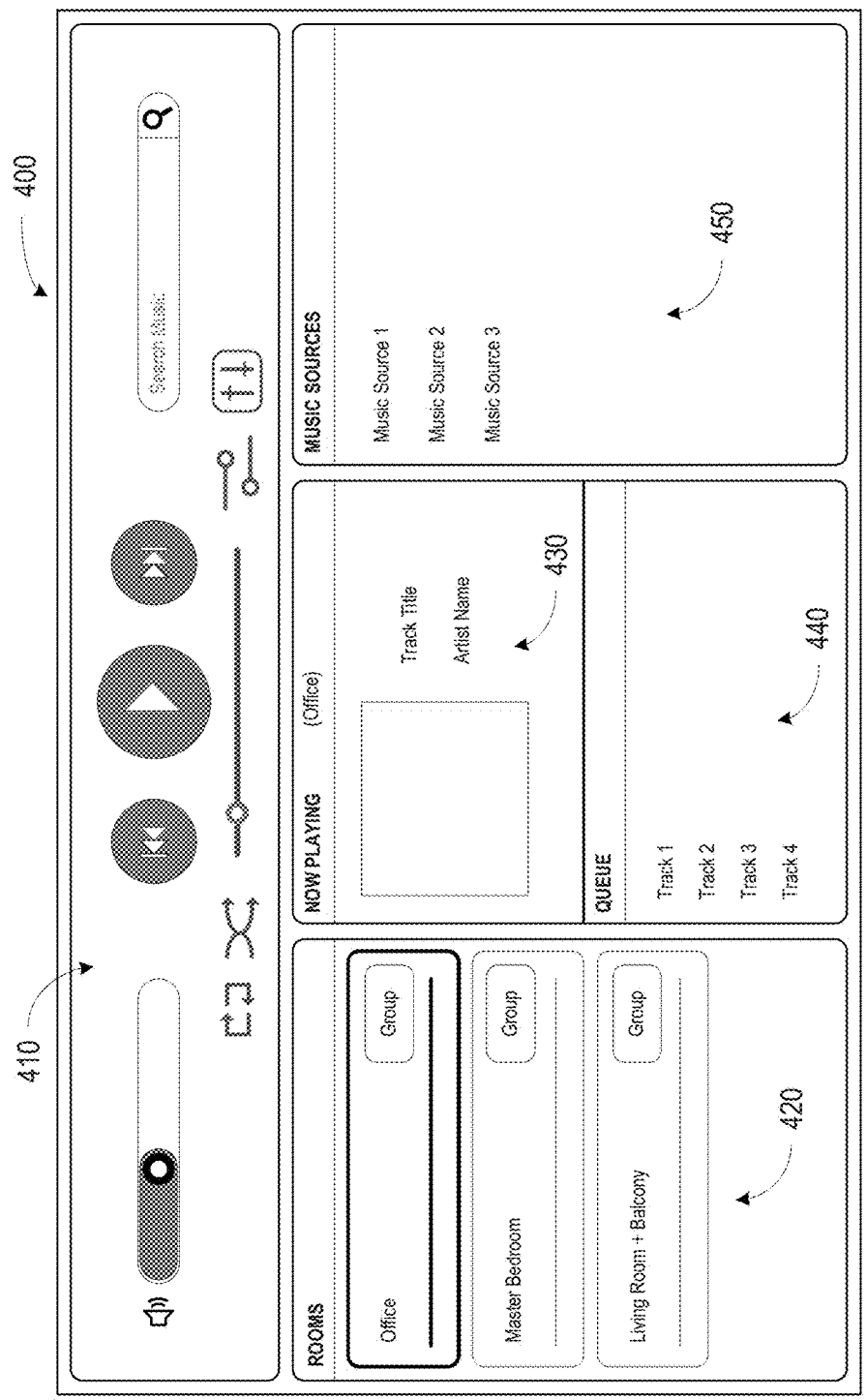
FIG. 4 shows an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Network Devices

Figure 5:
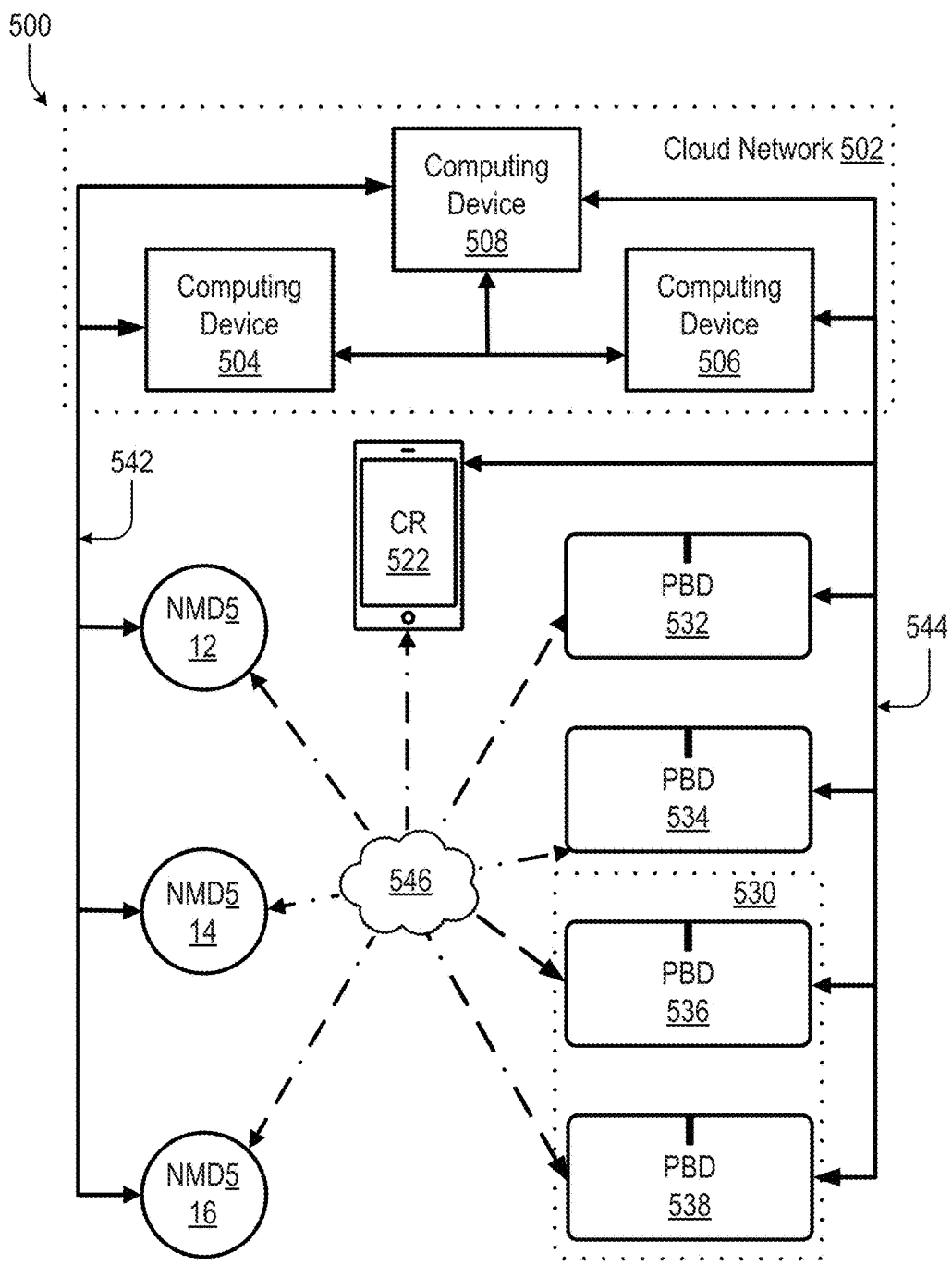
FIG. 5 shows an example plurality of network devices.

FIG. 5 shows an example plurality of network devices 500 that can be configured to provide an audio playback experience with voice control. One having ordinary skill in the art will appreciate that the devices shown in FIG. 5 are for illustrative purposes only, and variations including different and/or additional (or fewer) devices may be possible. As shown, the plurality of network devices 500 includes computing devices 504, 506, and 508; network microphone devices (NMDs) 512, 514, and 516; playback devices (PBDs) 532, 534, 536, and 538; and a controller device (CR) 522. As described previously, any one or more (or all) of the NMDs 512-16, PBDs 532-38, and/or CR 522 may be voice-enabled devices (VEDs).

Each of the plurality of network devices 500 are network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 are part of a cloud network 502. The cloud network 502 may include additional computing devices (not shown). In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 are devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 is configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 are shown as members of a bonded zone 530, while PBDs 532 and 534 are members of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516. For example, any one or more (or perhaps all) of NMDs 512-16, PBDs 532-38, and/or CR 522 may be voice-enabled devices (VEDs).

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve and/or include one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may be different (or perhaps change) depending on types of communication requirements between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of network devices 500, as described above, may be performed by one or more other devices in the plurality of network devices 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
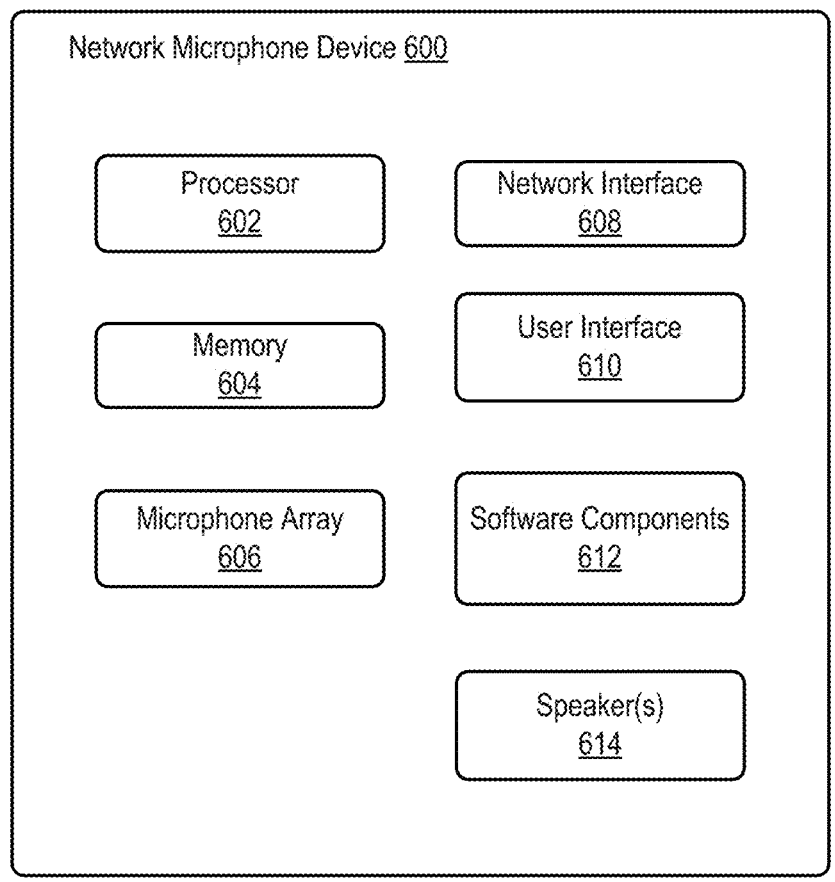
FIG. 6 shows a functional block diagram of an example network microphone device.

FIG. 6 shows a function block diagram of an example network microphone device 600 that may be configured to be one or more of NMDs 512, 514, and 516 of FIG. 5, and/or any of the VEDs disclosed and described herein. As shown, the network microphone device 600 includes one or more processors 602, tangible, non-transitory computer-readable memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The tangible, non-transitory computer-readable memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Beamforming System

Figure 7:
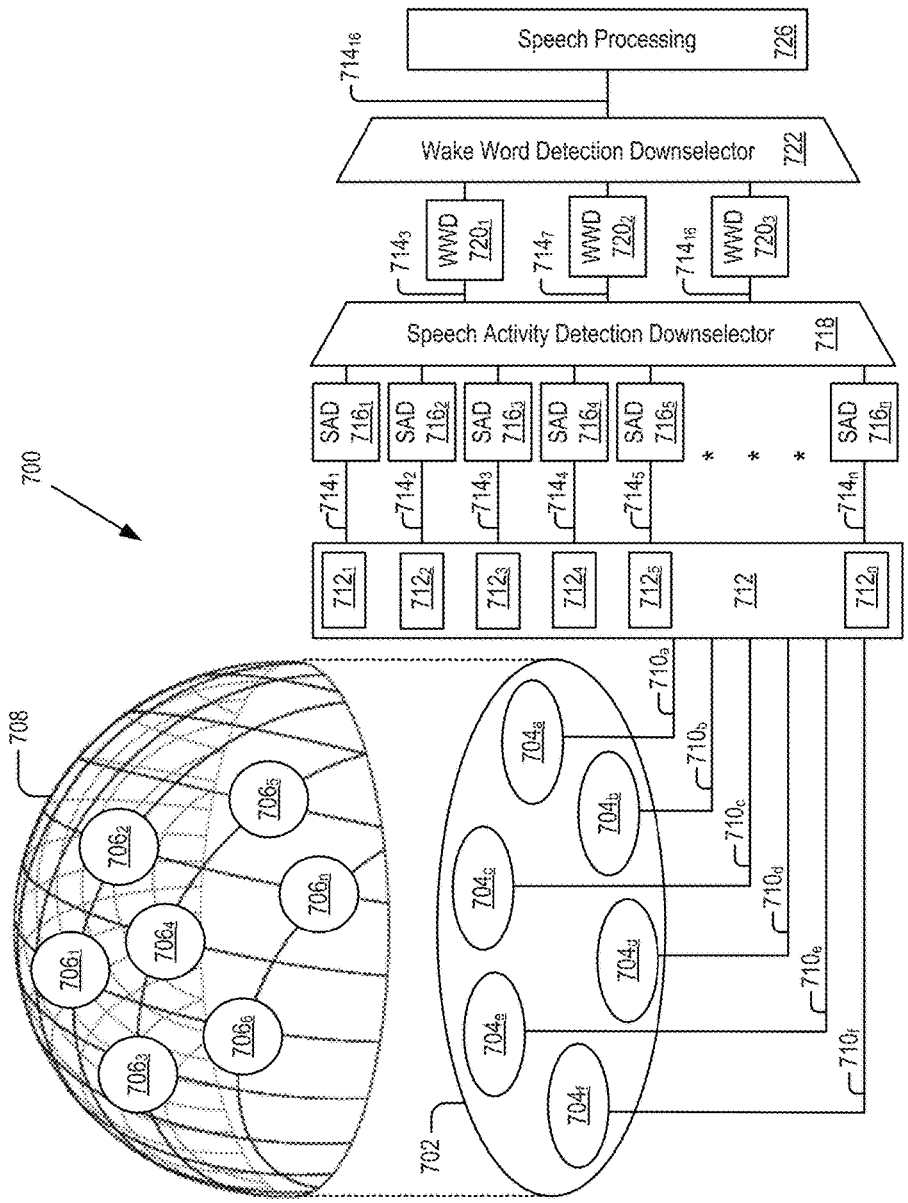
FIG. 7 shows an example functional block diagram of a networked microphone device configured to perform beamforming according to some embodiments.

FIG. 7 shows a network device 700, according to example embodiments. Network device 700 includes a microphone array 702 comprising a plurality of microphones $704_{a-f}$. Network device 700 also includes one or more processors (not shown) and tangible, non-transitory computer-readable memory (not shown) that stores computer-readable software code that is executable by the one or more processors to perform, among other features, the beamforming functions disclosed and described herein. In operation, network device 700 may be the same as or similar to any of the PBDs, NMDs, controller devices, or other VEDs disclosed and/or described herein, or any other voice-enabled device now known or later developed.

Microphone array 702 is a planar microphone array comprising six microphones. In some embodiments, the microphone array 702 may include more or fewer than the six microphones $704_{a-f}$ shown in FIG. 7. Similarly, in some embodiments, the microphone array 702 may be another type of microphone array than a planar microphone array.

In operation, the microphones $704_{a-f}$ of microphone array 702 detect sound within a three-dimensional an area 708 around the microphone array 702. In operation, each microphone of microphone array 702 generates a sound signal corresponding to the sound that it detected. [95] In the example shown in FIG. 7, microphone $704_a$ generates sound signal $710_a$ corresponding to sound detected by microphone $704_a$; microphone $704_b$ generates sound signal $710_b$ corresponding to sound detected by microphone $704_b$; microphone $704_c$ generates sound signal $710_c$ corresponding to sound detected by microphone $704_c$; microphone $704_d$ generates sound signal $710_d$ corresponding to sound detected by microphone $704_d$; microphone $704_e$ generates sound signal $710_e$ corresponding to sound detected by microphone $704_e$; and microphone $704_f$ generates sound signal $710_f$ corresponding to sound detected by microphone $704_f$.

The network device 700 generates a set of n received-sound beams $714_1$-$714_n$ by applying a plurality of sets of beamforming coefficients by beamformers $712_1$-$712_n$ to the sound signals $710_a$-$710_f$ generated by microphones $704_a$-$704_f$ of microphone array 702. In some embodiments, the beamforming coefficients used by the beamformers $712_1$-$712_n$ to generate the n received-sound beams are arranged in a polar response matrix stored in tangible, non-transitory computer-readable memory of the network device 700. [97] In some embodiments, generating the set of n received-sound beams $714_1$-$714_n$ includes (i) generating a plurality of sound signals $710_a$-$710_f$ via the microphone array 702, where each microphone 704 of the microphone array 702 generates a separate, corresponding sound signal 710; (ii) providing the plurality of sound signals $710_a$-$710_f$ to each beamformer of the set of n beamformers $712_1$-$712_n$, where each beamformer in the set of n beamformers $712_1$-$712_n$ corresponds to a specific one of the separate three-dimensional polar directions $706_1$-$706_n$ relative to the microphone array 702; and (iii) at each beamformer, applying the beamformer's coefficients to each sound signal of the plurality of sound signals $710_a$-$710_f$ to generate a received-sound beam 714 corresponding to the separate three-dimensional polar direction 706 corresponding to the beamformer 712. [98] For example, each of sound signals $710_{a-f}$ generated by microphones $704_{a-f}$ of microphone 702 are provided to each beamformer of the set of n beamformers $712_1$-$712_n$. Each beamformer of the set of n beamformers $712_1$-$712_n$ corresponds to a specific three-dimensional polar direction 706 relative to the microphone array 702. In operation, each beamformer of the n beamformers $712_1$-$712_n$ generates a separate corresponding received-sound beam $714_1$-$714_n$, and each received-sound beam corresponds to a three-dimensional polar direction relative to the microphone array 702. FIG. 7 shows beamformers $712_1$-$712_n$ as separate components for illustration purposes. In some embodiments, each beamformer $712_1$-$712_n$ may be implemented as software executed by one or more processors of the network device 700.

In the example shown in FIG. 7, beamformer $712_1$ applies a first set of beamformer coefficients (not shown) to sound signals $710_{a-f}$ generated by microphones $704_{a-f}$ and generates received-sound beam $714_1$ which corresponds to sound originating from three-dimensional polar direction $706_1$ relative to the microphone array 702 in area 708; beamformer $712_2$ applies a second set of beamformer coefficients (not shown) to sound signals $710_{a-f}$ generated by microphones $704_{a-f}$ and generates received-sound beam $714_2$ which corresponds to sound originating from three-dimensional polar direction $706_2$ relative to the microphone array 702 in area 708; beamformer $712_3$ applies a third set of beamformer coefficients (not shown) to sound signals $710_{a-f}$ generated by microphones $704_{a-f}$ and generates received-sound beam $714_3$ which corresponds to sound originating from three-dimensional polar direction $706_3$ relative to the microphone array 702 in area 708; beamformer $712_4$ applies a fourth set of beamformer coefficients (not shown) to sound signals $710_{a-f}$ generated by microphones $704_{a-f}$ and generates received-sound beam $714_4$ which corresponds to sound originating from three-dimensional polar direction $706_4$ relative to the microphone array 702 in area 708; beamformer $712_5$ applies a fifth set of beamformer coefficients (not shown) to sound signals $710_{a-f}$ generated by microphones $704_{a-f}$ and generates received-sound beam $714_5$ which corresponds to sound originating from three-dimensional polar direction $706_5$ relative to the microphone array 702 in area 708; and beamformer $712_n$ applies an $n^{th}$ set of beamformer coefficients (not shown) to sound signals $710_{a-f}$ generated by microphones $704_{a-f}$ and generates received-sound beam $714_n$ which corresponds to sound originating from three-dimensional polar direction $706_n$ relative to the microphone array 702 in area 708.

In some embodiments, the set of n beamformers $712_1$-$712_n$ comprises between about 10 and 30 separate beamformers, where each separate beamformer applies a separate set of static beamforming coefficients to the set of sound signals generated by the plurality of microphones of the microphone array to generate a separate received-sound beam corresponding to a separate direction relative to the microphone array. For example, in embodiments where n=20, the set of n beamformers 712 has 20 separate beamformers $712_1$-$712_{20}$. Each of the beamformers $712_1$-$712_{20}$ generates a separate received-sound beam $714_1$-$714_{20}$ that corresponds to a separate three-dimensional polar direction relative to the microphone array 702. However, in some embodiments, the set of n beamformers includes more or fewer than about 10-30 separate beamformers. In some embodiments, the set of n beamformers includes about 15 to about 20 separate beamformers and corresponding sets of beamforming coefficients arranged in the polar response matrix.

In operation, the network device 700 processes each received-sound beam $714_1$-$714_n$ in parallel (or substantially in parallel) in real-time (or substantially real time), and multiple down selection stages 718 (speech activity detection downselection) and 722 (wake word detection downselection) operate to select a final received-sound beam to process for a voice command. In some embodiments, the final received-sound beam selected for voice processing for a voice command is the received-sound beam having speech content with the highest likelihood of comprising a wake word.

First, the network device 700 runs a speech activity detection procedure on each of the received-sound beams $714_1$-$714_n$ to identify a subset of the received-sound beams $714_1$-$714_n$ that include speech content. In the example shown in FIG. 7, the network device 700 provides each received-sound beam $714_1$-$714_n$ to a separate speech activity detector $716_1$-$716_n$. FIG. 7 shows speech activity detectors $716_1$-$716_n$ as separate components for illustration purposes. In embodiments, each speech activity detector $716_1$-$716_n$ may be implemented as software executed by one or more processors of the network device 700.

In some embodiments, the step of identifying a subset of the received-sound beams $714_1$-$714_n$ having speech content includes the network device 700: (i) calculating a correlation metric for each received-sound beam relative to every other received-sound beam of the set of received-sound beams $714_1$-$714_n$; (ii) storing each received-sound beam's correlation metric relative to every other received-sound beam in a cross-correlation matrix; and (iii) selecting for further processing, a subset of received-sound beams having a high likelihood of speech content and a low correlation with one another based at least in part on the received-sound beam's beamforming coefficients and the cross-correlation matrix.

In some embodiments, selecting the subset of received-sound beams having a high likelihood of speech content and a low correlation with one another based at least in part on the received-sound beam's beamforming coefficients and the cross-correlation matrix includes the network device 700: (i) ranking each received-sound beam based on the received-sound beam's likelihood of comprising speech content; and (ii) based on the ranking, selecting a top subset of two or more least-correlated received-sound beams for further processing. In some embodiments, selecting a top subset of two or more least-correlated received-sound beams for further processing comprises selecting between about 3 to 5 received-sound beams for further processing. For example, in the embodiment shown in FIG. 700, the subset of received-sound beams selected by speech activity detection downselector 718 for further processing includes received-sound beam $714_3$, received-sound beam $714_7$, and received-sound beam $714_{20}$.

After the speech activity detection downselector 718 has selected a subset of the received-sound beams for further processing, the network device 700 (individually or in combination with one or more other computing devices) runs a wake word detection procedure for each of the selected subset of received-sound beams (i.e., received-sound beam $714_3$, received-sound beam $714_7$, and received-sound beam $714_{20}$) to determine, for each received-sound beam in the subset of received sound beams ($714_3$, $714_7$, and $714_{20}$), whether the speech content of each received-sound beam includes a wake word.

In the example shown in FIG. 7, the network device 700 provides each received-sound beam of the selected subset of received-sound beams ($714_3$, $714_7$, and $714_{16}$) to a separate wake word detector $720_1$-$720_3$. In particular, network device 700 provides received-sound beam $714_3$ to wake word detector $720_1$; provides received-sound beam $714_7$ to wake word detector $720_2$; and provides received-sound beam $714_{16}$ to wake word detector $720_3$. FIG. 7 shows speech activity detectors $720_1$-$720_3$ as separate components for illustration purposes. In some embodiments, each speech activity detector $720_1$-$720_3$ may be implemented as software executed by one or more processors of the network device 700. Similarly, in some embodiments, wake word detection can be performed on more or fewer than three received-sound beams shown in the example of FIG. 7.

In some embodiments, determining whether the speech content comprises a wake word includes the network device 700 ranking a top subset of two or more least-correlated received-sound beams based on, for each received-sound beam in the top subset of two or more least-correlated received-sound beams, a likelihood that speech content of the received-sound beam comprises the wake word.

Alternatively, in some embodiments, determining whether the speech content comprises a wake word includes the network device 700 transmitting a speech sample from each received-sound beam in the selected subset of received-sound beams (714$_3$, 714$_7$, and 714$_{16}$) to a separate computing device and/or computing system for voice analysis to determine whether the speech sample includes the wake word. In some embodiments, the separate computing system may include one or more of computing devices 504, 506, and/or 508 shown and described with reference to FIG. 5.

In some embodiments, the network device 700 is further configured to select at least one final received-sound beam from the received-sound beams in the selected subset of the received-sound beams determined to comprise a wake word, and then cause the selected one final received-sound beam to be processed to identify a voice command. Causing the selected one final received-sound beam to be processed to identify a voice command includes one or both of (i) the network device 700 processing a sound sample from the selected one final received-sound beam to identify a voice command and/or (ii) the network device 700 transmitting a sound sample from the selected one final received-sound beam to another computing device and/or computing system for voice analysis. In some embodiments, the separate computing system may include one or more of computing devices 504, 506, and/or 508 (FIG. 5).

For example, in FIG. 7, wake word detection downselector 722 selects received-sound beam 714$_{16}$ as the final received-sound beam for speech processing to determine a voice command after a wake word.

In some embodiments, the network device 700 performs speech processing at speech processing block 726 to determine a voice command after a wake word. In some embodiments, the network device 700 is additionally configured to mix an inverse of a received-sound beam orthogonal to the selected one final received-sound beam 714$_{16}$ with the selected one final received-sound beam 714$_{16}$ before conducting speech processing on the selected one final received-sound beam 714$_{16}$ to determine a voice command following the wake word.

FIG. 7 shows speech processing block 726 as a component of network device 726 for illustration purposes. In some embodiments, the speech processing block 726 may be implemented as software executed by one or more processors of the network device 700. Or as described above, in some embodiments, speech processing block 726 may be implemented by one or more other computing devices and/or systems, e.g., computing devices 504, 506, and/or 508 (FIG. 5)

IV. Generating Beamforming Coefficients for the Beamformers

As described in detail above, in some embodiments, the three-dimensional beamforming performed by a network device 700 includes: (i) generating a set of received-sound beams by applying a plurality of sets of beamforming coefficients stored in the tangible, non-transitory computer-readable memory to sound received via a microphone array, where each received-sound beam corresponds to a separate three-dimensional direction relative to the microphone array; (ii) identifying a subset of the received-sound beams comprising speech content; (iii) for each received-sound beam in the subset of the received-sound beams comprising speech content, determining whether the speech content comprises a wake word; (iv) selecting one final received-sound beam from the received-sound beams in the subset of the received-sound beams determined to comprise a wake word; and (v) causing the selected one final received-sound beam to be processed to identify a voice command.

In some embodiments, one or more sets (and perhaps every set) of the plurality of sets of beamforming coefficients stored in the tangible, non-transitory computer-readable memory of the network device 700 and used by beamformers 712$_1$-712$_n$ comprises a static set of beamforming coefficients. In some embodiments, the static set of beamforming coefficients is generated by a procedure during the design and development of the network device 700, and then stored in the tangible, non-transitory computer-readable memory of the network device 700 by the network device 700 manufacturer.

In some embodiments, during the design and development of the network device 700, the network device manufacturer positions a reference microphone array for characterization. In some embodiments, the reference microphone array is positioned within an anechoic chamber. The reference microphone array used for generating the beamforming coefficients is substantially the same as the microphone arrays that will be integrated within the network device 700 during manufacturing.

In some embodiments, positioning the reference microphone array includes positioning a reference network device 700 comprising the reference microphone array within the anechoic chamber, where the reference network device 700 comprising the reference microphone array is substantially the same as the network devices comprising microphone arrays that will be manufactured.

Once the reference microphone array is positioned for characterization (within an anechoic chamber or otherwise), the manufacturer uses a movable/portable speaker or other apparatus capable of generating a sound from a plurality of directions relative to the microphone array. For example, referring to FIG. 7, assume the microphone array 702 is the reference microphone array and area 708 is an area within an anechoic chamber. The manufacturer uses the movable/portable speaker or other apparatus to generate a sound from each three-dimensional polar direction surrounding the microphone array 702 for which it will be desirable for the network device, in operation, to generate a received-sound beam. For example, with reference to FIG. 7, a first sound is generated from three-dimensional polar direction 706$_1$, a second sound is from three-dimensional polar direction 706$_2$, a third sound is generated from three-dimensional polar direction 706$_3$, and so on through the $n^{th}$ sound generated from three-dimensional polar direction 706$_n$. In various embodiments, n may equal any number of three-dimensional polar directions. A higher value for n will enable higher resolution spatial localization but with increased computational load, whereas a lower value for n will enable lower resolution spatial localization at a reduced computational load.

For each of the $1^{st}$ through $n^{th}$ sounds generated from directions 706$_1$-706$_n$, each of the microphones 704$_a$-704$_f$ generates a corresponding sound signal 710$_a$-710$_f$. The difference between the spectral and temporal responses of each microphone in the microphone array 702 relative to every other microphone in the microphone array 702 is calculated and stored in an iterative matrix. This iterative matrix constitutes a polar response matrix comprising the plurality of sets of beamforming coefficients that are stored in the tangible, non-transitory computer-readable memory of the network device 700. In operation, each set of beamforming coefficients (i.e., sets 1-n) will used by a corresponding beamformer (i.e., beamformers $712_1$-$712_n$) to generate a corresponding received-sound beam (i.e., received-sound beams $714_1$-$714_n$).

In this manner, in some embodiments, generating the static set of beamforming coefficients arranged in the polar response matrix stored in the tangible, non-transitory computer-readable memory of the network device 700 includes: (i) positioning a reference microphone array in an anechoic chamber; and (ii) generating a first set of beamforming coefficients based on a first plurality of measurements of a corresponding first plurality of sounds, wherein each sound of the corresponding first plurality of sounds originates from a separate three-dimensional direction in the anechoic chamber relative to the reference microphone array positioned in the anechoic chamber.

In some embodiments, it may be advantageous to adjust at least some of the beamforming coefficients to account for slight differences between the reference microphone array and an actual microphone array 702 positioned within a network device 700. Slight differences between the reference microphone array and an actual microphone array 702 positioned within a network device 700 may normally arise because of manufacturing tolerances. In some embodiments, the adjustment is made after manufacturing but before the manufacturer packages the network device 700 for shipping to a retailer, distributor, or end customer. In some embodiments, the adjustment could be made by an end user.

Once the network device 700 (comprising the microphone array 702) is positioned for performing the beamforming coefficient adjustment, the manufacturer (or perhaps the end user) uses a movable or portable speaker or other apparatus capable of generating a sound from a plurality of three-dimensional directions relative to the microphone array to generate sounds for the beamforming coefficient adjustment procedure. The manufacturer (or perhaps end user) uses the portable speaker or other apparatus to generate a sound from one or more (or perhaps all) of the three-dimensional directions/locations surrounding the microphone array 702 that were used to generate the original sets of beamforming coefficients stored in the polar response matrix.

For example, referring to FIG. 7, the portable/movable speaker or other apparatus is used to generate one or more of a first sound from direction $706_1$, a second sound from direction $706_2$, a third sound from direction $706_3$, and so on through an $n^{th}$ sound from direction $706_n$. For each of the one or more sounds generated from each of the one or more directions $706_1$-$706_n$, each of the microphones $704_a$-$704_f$ generates a corresponding sound signal $710_a$-$710_f$. The difference between the spectral and temporal responses of each microphone in the microphone array 702 relative to every other microphone in the microphone array 702 is calculated and stored in a temporary iterative matrix for the network device 700 being characterized. The values in the temporary iterative matrix are then compared with corresponding values in the polar response matrix comprising the plurality of sets of beamforming coefficients stored in the tangible, non-transitory computer-readable memory of the network device 700. The difference, if any, between a value in the temporary iterative matrix and its corresponding value in the polar response matrix can be used as an offset (or at least an input for determining an offset) for one or more beamforming coefficients stored in the polar response matrix.

In this manner, generating the static set of beamforming coefficients stored in the tangible, non-transitory computer-readable memory of the network device 700 additionally includes: (i) positioning the network device 700 for characterization (typically outside of the anechoic chamber); (ii) generating a second set of beamforming coefficients based on a second plurality of measurements of a corresponding second plurality of sounds, wherein each sound of the corresponding second plurality of sounds originates from a separate three-dimensional direction relative to the network device being characterized; and (iii) generating at least one set of the plurality of sets of beamforming coefficients based on the first set of beamforming coefficients and the second set of beamforming coefficients.

In some embodiments, generating the at least one set of the plurality of sets of beamforming coefficients based on the first set of beamforming coefficients and the second set of beamforming coefficients comprises: (i) determining an offset value between at least one beamforming coefficient of the first set of beamforming coefficients and at least one corresponding beamforming coefficient of the second set of beamforming coefficients; and (ii) adjusting at least one beamforming coefficient of the first set of beamforming coefficients based at least in part on the determined offset.

V. Example Three-Dimensional Beamforming Methods

Figure 8:
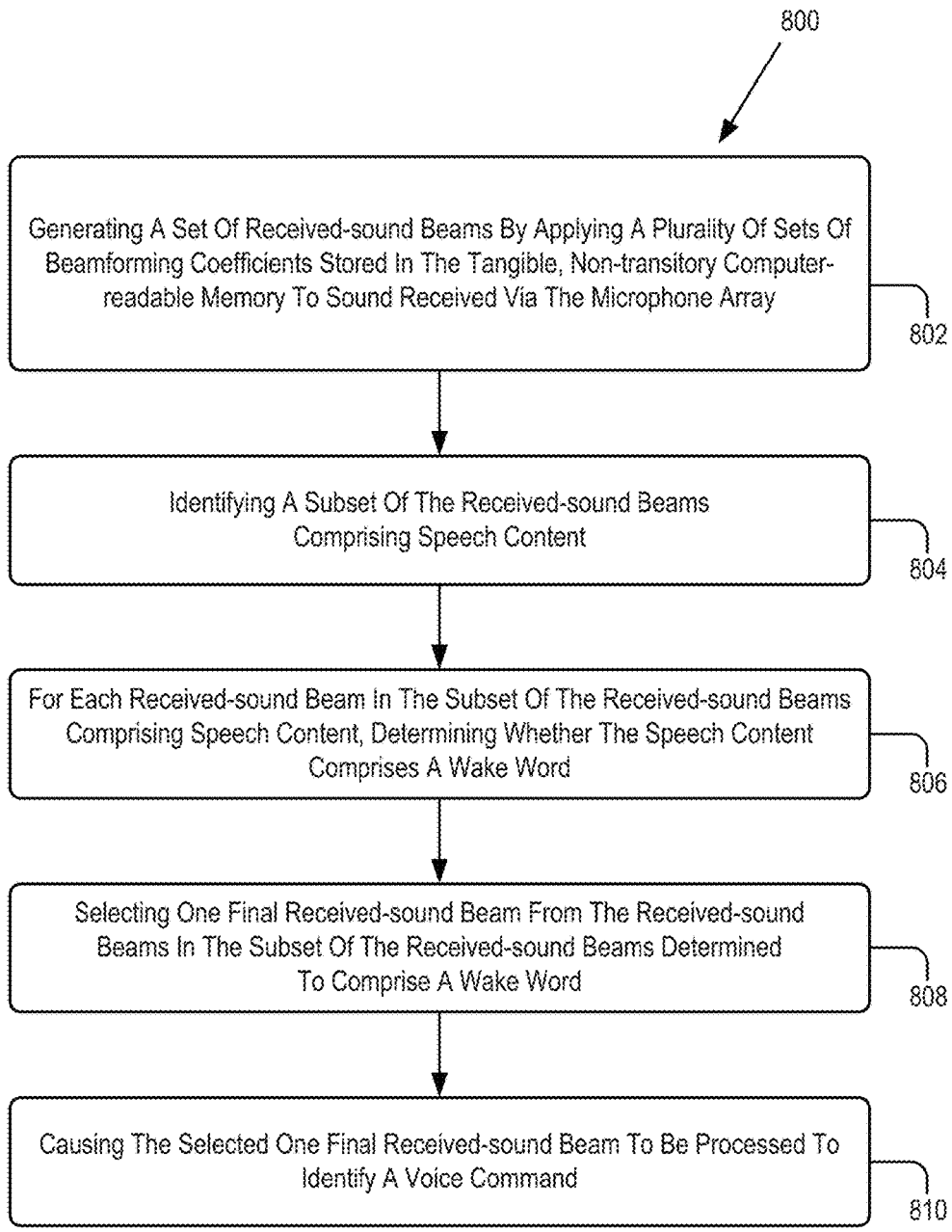
FIG. 8 shows an example method according to some embodiments.

FIG. 8 shows an example embodiment of a method 800 that can be implemented by a network device, such as network device 700 or any of the PBDs, NMDs, controller devices, or other VEDs disclosed and/or described herein, or any other voice-enabled device now known or later developed.

Various embodiments of method 800 include one or more operations, functions, and actions illustrated by blocks 802 through 810. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 800 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Method 800 begins at block 802, which includes generating a set of received-sound beams by applying a plurality of sets of beamforming coefficients stored in the tangible, non-transitory computer-readable memory to sound received via the microphone array, wherein each received-sound beam corresponds to a separate direction relative to the microphone array. In operation, the step of generating a set of received-sound beams at block 802 can be performed according to any of the beamforming methods disclosed and described herein and/or any beamforming method now known or later developed. In some embodiments, each separate direction relative to the microphone array is a three-dimensional polar direction relative to the microphone array.

In some embodiments, the microphone array comprises a planar microphone array comprising two or more microphones arranged on a two-dimensional plane, or at least a substantially two-dimensional plane. In some embodiments, each set of the plurality of sets of beamforming coefficients stored in the tangible, non-transitory computer-readable memory comprises a static set of beamforming coefficients. In some embodiments, the static set of beamforming coefficients is determined according to method 900 described herein with reference to FIG. 9.

In some embodiments, the step of generating a set of received-sound beams by applying a plurality of sets of beamforming coefficients stored in the tangible, non-transitory computer-readable memory to sound received via the microphone array at block 802 comprises one or more of: (i) generating a plurality of sound signals via the microphone array, where each microphone of the microphone array generates a separate sound signal; (ii) providing the plurality of sound signals to each beamformer of a set of beamformers, where each beamformer in the set of beamformers corresponds to one of the separate directions relative to the microphone array; and (iii) at each beamformer, applying the beamformer's coefficients to each sound signal of the plurality of sound signals to generate a received-sound beam corresponding to the separate direction relative to the microphone array corresponding to the beamformer.

In some embodiments, the step of generating a set of received-sound beams by applying a plurality of sets of beamforming coefficients stored in the tangible, non-transitory computer-readable memory to sound received via the microphone array at block 802 comprises generating between about 15 to 30 separate received-sound beams. However, more or fewer separate received-sound beams could be generated, depending on a desired implementation.

Next, method 800 advances to block 804, which includes identifying a subset of the received-sound beams comprising speech content. In some embodiments, identifying a subset of the received-sound beams comprising speech content comprises the network device performing voice activity detection or a similar algorithm on each of the received-sound beams to determine, for each received-sound beam, whether the received-sound beam includes speech content. In some embodiments, determining whether the received-sound beam includes speech content comprises the network device transmitting a speech sample of the received-sound beam to a separate computing system for analysis. In operation, the step of identifying a subset of the received-sound beams comprising speech content at block 804 can be performed according to any of the speech detection methods disclosed and described herein and/or any speech detection method now known or later developed.

In some embodiments, the step of identifying a subset of the received-sound beams comprising speech content in block 804 comprises one or more of: (i) calculating a correlation metric for each received-sound beam relative to every other received-sound beam of the set of received-sound beams; (ii) storing each received-sound beam's correlation metric relative to every other received-sound beam in a cross-correlation matrix; and (iii) selecting for further processing, a subset of received-sound beams having a high likelihood of speech content and a low correlation with one another based on the received-sound beam's beamforming coefficients and the cross-correlation matrix.

In some embodiments, selecting for further processing, a subset of received-sound beams having a high likelihood of speech content and a low correlation with one another based on the received-sound beam's beamforming coefficients and the cross-correlation matrix comprises: (i) ranking each received-sound beam based on its likelihood of comprising speech content; and (ii) based on the ranking, selecting a top subset of two or more least-correlated received-sound beams for further processing. In some embodiments, selecting a top subset of two or more least-correlated received-sound beams for further processing comprises selecting between about 3 to 5 received-sound beams for further processing. However, more or fewer received-sound beams could be selected for further processing, depending on a desired implementation.

Next, method 800 advances to block 806, which includes for each received-sound beam in the subset of the received-sound beams comprising speech content, determining whether the speech content comprises a wake word. In some embodiments, the step of determining whether the speech content comprises a wake word in block 806 includes the network device performing one or more voice processing algorithms on each received-sound beam in the subset of the received-sound beams comprising speech content to determine whether the speech content of any received-sound beam in the subset of received-sound beams comprising speech content includes a wake word. In some embodiments, the step of determining whether the speech content comprises a wake word in block 806 additionally or alternatively includes the network device transmitting a speech sample from one or more received-sound beams in the subset of the received-sound beams comprising speech content to a separate computing system for voice analysis to determine whether the speech content includes a wake word. In operation, the step of determining whether the speech content comprises a wake word at block 806 can be performed according to any of the wake word detection methods disclosed and described herein and/or any wake word detection method now known or later developed.

In some embodiments, the step of determining whether the speech content comprises a wake word in block 806 comprises ranking a top subset of two or more least-correlated received-sound beams based on, for each received-sound beam in the top subset of two or more least-correlated received-sound beams, a likelihood that speech content of the received-sound beam comprises the wake word. In some embodiments, the highest-ranking received-sound beam is the received-sound beam having speech content with the highest likelihood of comprising the wake word.

Next, method 800 advances to block 808, which includes selecting one final received-sound beam from the received-sound beams in the subset of the received-sound beams determined to comprise a wake word. Some embodiments may additionally include mixing an inverse of a received-sound beam orthogonal to the selected one final received-sound beam with the selected one final received-sound beam.

Finally, method 800 advances to block 810, which includes causing the selected one final received-sound beam to be processed to identify a voice command. In some embodiments, the step of causing the selected one final received-sound beam to be processed to identify a voice command in block 810 includes the network device performing one or more voice processing algorithms on the selected one final received-sound beam to identify and/or extract a voice command for further processing. In some embodiments, the step of causing the selected one final received-sound beam to be processed to identify a voice command in block 810 includes the network device transmitting a speech sample of the selected one final received-sound beam to a separate computing system for voice analysis.

VI. Example Beamforming Coefficient Generation Methods

Figure 9:
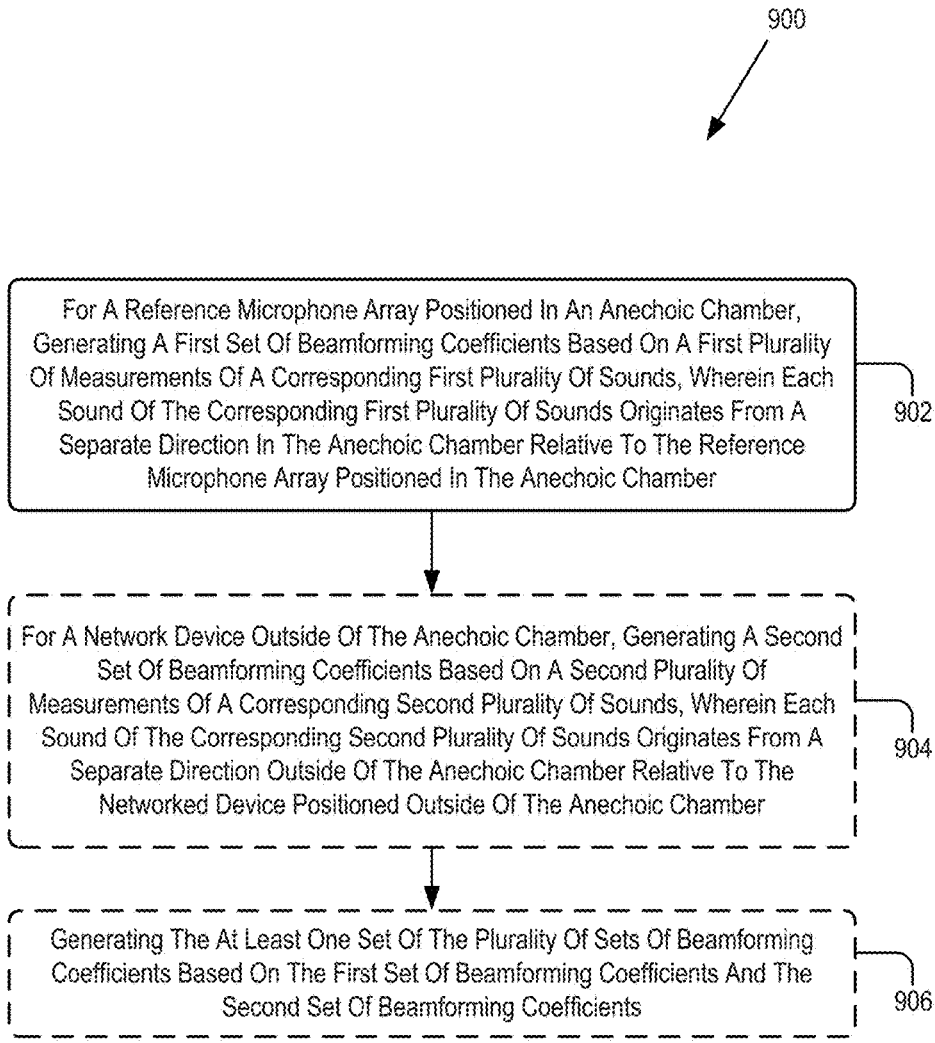
FIG. 9 shown an example method according to some embodiments.

FIG. 9 shows an example embodiment of a method 900 that can be implemented typically by a manufacturer of network device, such as network device 700 or any of the PBDs, NMDs, controller devices, or other VEDs disclosed and/or described herein, or any other voice-enabled device now known or later developed.

Various embodiments of method 900 include one or more operations, functions, and actions illustrated by blocks 902 through 906. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 900 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

Method 900 begins at block 902, which includes, for a reference microphone array positioned for characterization (for example, positioned in an anechoic chamber), generating a first plurality of sets of beamforming coefficients based on a first plurality of measurements of a corresponding first plurality of sounds, wherein each sound of the corresponding first plurality of sounds originates from a separate direction in the anechoic chamber relative to the reference microphone array positioned in the anechoic chamber. In some embodiments, each separate direction in the anechoic chamber relative to the reference microphone array positioned in the anechoic chamber is a separate three-dimensional polar direction relative to the microphone array. In operation, the step of generating the first set of beamforming coefficients can be performed according to any of the beamforming coefficient generation procedures disclosed and/or described herein and/or any other beamforming coefficient generation procedure now known or later developed.

In some embodiments, method 900 optionally advances to block 904, which includes steps performed after a particular network device has been manufactured, but typically before that particular network device has been packaged for shipping to a retailer, distributor, or end customer. Block 904 includes, for a network device positioned for characterization (typically outside of the anechoic chamber), generating a second plurality of sets of beamforming coefficients based on a second plurality of measurements of a corresponding second plurality of sounds, wherein each sound of the corresponding second plurality of sounds originates from a separate direction relative to the network device positioned outside of the anechoic chamber. In some embodiments, each separate direction relative to the network device is a separate three-dimensional polar direction relative to the network device.

Next, method 900 optionally advances to block 906, which includes generating one or more beamforming coefficients based on the first plurality of sets of beamforming coefficients and the second plurality of sets of beamforming coefficients. In some embodiments, the step of generating one or more beamforming coefficients based on the first plurality of sets of beamforming coefficients and the second plurality of sets of beamforming coefficients in block 906 comprises: (i) determining an offset value between at least one beamforming coefficient of one of the first sets of beamforming coefficients and at least one corresponding beamforming coefficient of at least one of the second sets of beamforming coefficients; and (ii) adjusting one or more beamforming coefficients of the first plurality of sets of beamforming coefficients based at least in part on the determined offset. Some embodiments additionally include storing the adjusted one or more beamforming coefficients of the first plurality of sets of beamforming coefficients in the tangible, non-transitory computer-readable memory of the network device. For example, in some embodiments, after the functions of block 906 are performed, the polar array matrix of the network device includes the adjusted beamforming coefficients rather than the original beamforming coefficients in the first plurality of sets of beamforming coefficients.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a computer memory, DVD, CD, Blu-ray, and so on, storing the software and/or firmware.

What is claimed is:

1. A network device comprising:
   one or more processors;
   a microphone array; and
   tangible, non-transitory computer-readable media comprising instructions encoded therein, wherein the instructions, when executed by the one or more processors, cause the network device to perform a method comprising:
   generating a set of received-sound beams by applying a plurality of sets of beamforming coefficients stored in the tangible, non-transitory computer-readable memory to sound received via the microphone array, wherein each received-sound beam corresponds to a separate direction relative to the microphone array;
   identifying a subset of the received-sound beams comprising speech content;
   for each received-sound beam in the subset of the received-sound beams comprising speech content, determining whether the speech content comprises a wake word;
   selecting one final received-sound beam from the received-sound beams in the subset of the received-sound beams determined to comprise a wake word; and
   causing the selected one final received-sound beam to be processed to identify a voice command.

2. The network device of claim 1, wherein generating the set of received-sound beams by applying the plurality of sets of beamforming coefficients stored in the tangible, non-transitory computer-readable memory to sound received via the microphone array comprises:
   generating a plurality of sound signals via the microphone array, wherein each microphone of the microphone array generates a separate sound signal;
   providing the plurality of sound signals to each beamformer of a set of beamformers, wherein each beamformer in the set of beamformers corresponds to one of the separate directions relative to the microphone array; and
   at each beamformer, applying the beamformer's coefficients to each sound signal of the plurality of sound signals to generate a received-sound beam corresponding to the separate direction relative to the microphone array corresponding to the beamformer.

3. The network device of claim 1, wherein generating the set of received-sound beams by applying the plurality of sets of beamforming coefficients stored in the tangible, non-transitory computer-readable memory to sound received via the microphone array comprises generating between about 15 to 20 separate received-sound beams.

4. The network device of claim 1, wherein at least one set of the plurality of sets of beamforming coefficients stored in the tangible, non-transitory computer-readable memory comprises a static set of beamforming coefficients generated by a procedure comprising:
   for a reference microphone array positioned in an anechoic chamber, generating a first set of beamforming coefficients based on a first plurality of measurements of a corresponding first plurality of sounds, wherein each sound of the corresponding first plurality of sounds originates from a separate direction in the anechoic chamber relative to the reference microphone array positioned in the anechoic chamber.

5. The network device of claim 4, wherein the procedure for generating at least one set of the plurality of sets of beamforming coefficients stored in the tangible, non-transitory computer-readable memory further comprises, while the network device is positioned outside of the anechoic chamber:
   generating a second set of beamforming coefficients based on a second plurality of measurements of a corresponding second plurality of sounds, wherein each sound of the corresponding second plurality of sounds originates from a separate direction outside of the anechoic chamber relative to the network device positioned outside of the anechoic chamber; and
   generating the at least one set of the plurality of sets of beamforming coefficients based on the first set of beamforming coefficients and the second set of beamforming coefficients.

6. The network device of claim 5, wherein generating the at least one set of the plurality of sets of beamforming coefficients based on the first set of beamforming coefficients and the second set of beamforming coefficients comprises:
   determining an offset value between at least one beamforming coefficient of the first set of beamforming coefficients and at least one beamforming coefficient of the second set of beamforming coefficients; and
   adjusting at least one beamforming coefficient of the first set of beamforming coefficients based at least in part on the determined offset.

7. The network device of claim 1, wherein identifying the subset of the received-sound beams comprising speech content comprises:
   calculating a correlation metric for each received-sound beam relative to every other received-sound beam of the set of received-sound beams;

storing each received-sound beam's correlation metric relative to every other received-sound beam in a cross-correlation matrix; and selecting for further processing, a subset of received-sound beams having a high likelihood of speech content and a low correlation with one another based on a combination of the received-sound beam's beamforming coefficients and the cross-correlation matrix.

8. The network device of claim 7, wherein selecting for further processing, the subset of received-sound beams having a high likelihood of speech content and a low correlation with one another based on the combination of the received-sound beam's beamforming coefficients and the cross-correlation matrix comprises:

ranking each received-sound beam based on its likelihood of comprising speech content; and based on the ranking, selecting a top subset of two or more least-correlated received-sound beams for further processing.

9. The network device of claim 8, wherein selecting the top subset of two or more least-correlated received-sound beams for further processing comprises selecting between about 3 to 5 received-sound beams for further processing.

10. The network device of claim 1, wherein determining whether the speech content comprises a wake word comprises:

ranking a top subset of two or more least-correlated received-sound beams based on, for each received-sound beam in the top subset of two or more least-correlated received-sound beams, a likelihood that speech content of the received-sound beam comprises the wake word, wherein the selected one final received-sound beam is the received-sound beam having speech content with the highest likelihood of comprising the wake word.

11. The network device of claim 1, wherein the method further comprises:

mixing an inverse of a received-sound beam orthogonal to the selected one final received-sound beam with the selected one final received-sound beam.

12. The network device of claim 1, wherein the microphone array comprises a planar microphone array comprising two or more microphones arranged on a substantially two-dimensional plane.

13. The network device of claim 1, wherein each set of the plurality of sets of beamforming coefficients stored in the tangible, non-transitory computer-readable memory comprises a static set of beamforming coefficients.

14. The network device of claim 1, wherein for each received-sound beam in the subset of the received-sound beams comprising speech content, determining whether the speech content comprises a wake word comprises transmitting a speech sample of the received-sound beam to a separate computing system for voice analysis.

15. The network device of claim 1, wherein causing the selected one final received-sound beam to be processed to identify a voice command comprises transmitting a speech sample of the selected one final received-sound beam to a separate computing system for voice analysis.

16. The network device of claim 1, wherein the method further comprises:

mixing an inverse of a received-sound beam orthogonal to the selected one final received-sound beam with the selected one final received-sound beam.

17. Tangible, non-transitory computer-readable media comprising instructions encoded therein, wherein the instructions, when executed by one or more processors, cause a network device to perform a method comprising:

generating a set of received-sound beams by applying a plurality of sets of beamforming coefficients stored in a tangible memory of the network device to sound received via a microphone array of the network device, wherein each received-sound beam corresponds to a separate direction relative to the microphone array;

identifying a subset of the received-sound beams comprising speech content;

for each received-sound beam in the subset of the received-sound beams comprising speech content, determining whether the speech content comprises a wake word;

selecting one final received-sound beam from the received-sound beams in the subset of the received-sound beams determined to comprise a wake word; and causing the selected one final received-sound beam to be processed to identify a voice command.

18. The tangible, non-transitory computer-readable media of claim 17, wherein generating the set of received-sound beams by applying the plurality of sets of beamforming coefficients stored in the tangible, non-transitory computer-readable memory to sound received via the microphone array comprises:

generating a plurality of sound signals via the microphone array, wherein each microphone of the microphone array generates a separate sound signal;

providing the plurality of sound signals to each beamformer of a set of beamformers, wherein each beamformer in the set of beamformers corresponds to one of the separate directions relative to the microphone array; and at each beamformer, applying the beamformer's coefficients to each sound signal of the plurality of sound signals to generate a received-sound beam corresponding to the separate direction relative to the microphone array corresponding to the beamformer.

19. The tangible, non-transitory computer-readable media of claim 17, wherein identifying the subset of the received-sound beams comprising speech content comprises:

calculating a correlation metric for each received-sound beam relative to every other received-sound beam of the set of received-sound beams;

storing each received-sound beam's correlation metric relative to every other received-sound beam in a cross-correlation matrix; and selecting for further processing, a subset of received-sound beams having a high likelihood of speech content and a low correlation with one another based on a combination of the received-sound beam's beamforming coefficients and the cross-correlation matrix.

20. The tangible, non-transitory computer-readable media of claim 19, wherein selecting for further processing, the subset of received-sound beams having a high likelihood of speech content and a low correlation with one another based on the combination of the received-sound beam's beamforming coefficients and the cross-correlation matrix comprises:

ranking each received-sound beam based on its likelihood of comprising speech content; and based on the ranking, selecting a top subset of two or more least-correlated received-sound beams for further processing.

* * * * *